April 16, 1935. F. M. CLARK ET AL 1,998,309
HALOGENATED COMPOSITION
Filed Nov. 29, 1933
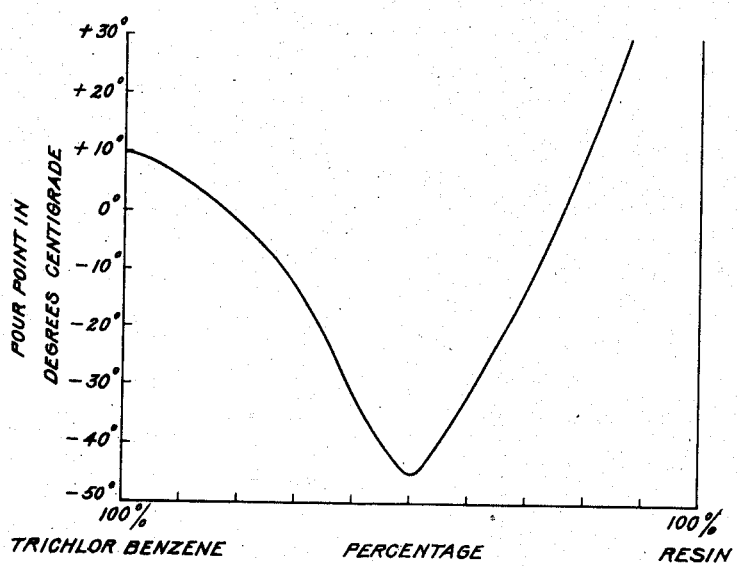
Inventors:
Frank M. Clark,
Walter M. Kutz,
by Harry E. Dunham
Their Attorney.

Patented Apr. 16, 1935

1,998,309

UNITED STATES PATENT OFFICE 1,998,309

HALOGENATED COMPOSITION

Frank M. Clark and Walter M. Kutz, Pittsfield, Mass., assignors to General Electric Company, a corporation of New York Application November 29, 1933, Serial No. 700,343

5 Claims. (Cl. 252—1)

The present invention comprises new hydrocarbon compositions which are suitable for use as dielectric materials in transformers, capacitors, switches, cables, electric bushings, and other forms of electrical devices. Such compositions may be used either alone or in conjunction with modifying ingredients.

As described in prior U. S. Patents 1,931,373 and 1,931,455, both patented October 17, 1933, it is advantageous to employ in transformers, capacitors, switches and other electrical devices a dielectric material comprising one or more liquid halogenated hydrocarbons preferably hydrocarbons containing a sufficiently high proportion of halogen to render non-inflammable whatever gases may be evolved for any reason from such dielectric. Heretofore only halogenated cyclic hydrocarbons, such for example as chlorinated diphenyl or chlorinated benzene have been found sufficiently stable for this purpose. Aliphatic compounds, such as carbon tetrachloride and chlorinated ethane have proven to be unsuitable because of chemical instability and corrosiveness toward metal members of electrical devices.

We have discovered that halogenated unsaturated olefin compounds may be caused to polymerize to form new compositions and that such compositions are suitable for use as dielectric materials either by themselves or in admixture with other insulating products.

The accompanying drawing is a graph showing the pour points of different mixtures of one of our new products and trichlor benzene.

Trichlor ethylene is a mobile liquid boiling at 85° C. When this liquid is heated in contact with aluminum chloride polymerization occurs with the formation of various polymerization products as will be described. When 30 mols of trichlor ethylene and 3 mols of aluminum chloride are heated in a reflux condenser at about 85° C. a liquid polymerization product is obtained having a boiling point of about 150 to 220° C. This polymerization product when purified by filtering through fuller's earth and sodium carbonate has a specific gravity of approximately 1.62. It has a dielectric constant at room temperature of 3.25, and functions with a power factor of approximately 2 per cent. The purified, polymerized product is chemically stable and is inert with respect to metals. For example, aluminum may be exposed to such product either in liquid or vapor form at temperatures as high as 100° C. without chemical action taking place. When heated under pressure in a sealed tube at 100° C. for 24 hours in an atmosphere of nitrogen no breakdown of the liquid occurred. It has refractive index at 25° C. of 1.5435 to 1.5485. It has a pour point or freezing point lower than minus 60° C. It has an acidity less than that neutralizable by .1 m. g. of sodium hydroxide per gram.

When the heating in the reflux condenser of the above product is continued for a longer time there is formed a more highly polymerized product which is a viscous semi-solid or a solid resin of dark red coloration and also having physical and chemical properties rendering it suitable for dielectric use. This product is not distillable at temperatures as high as 300° C. It is soluble in mineral oil. When this polymerized product is desired we prefer to employ a larger proportion of aluminum chloride than in the case above given. For example, when 2 mols of trichlor ethylene and 1 mol of aluminum chloride are refluxed at 85° C., the liquid polymerization product above described is evolved together with hydrogen chloride gas and upon continued heating the resinous product above described is formed. At the end of about fifteen minutes the polymerization will proceed as far as the formation of the liquid product. When the refluxing is continued for about one hour the red resinous mass is obtained. Trichlor ethylene also may be polymerized by passing its vapor through a tube heated to a temperature of about 600 to 700° C.

When the resinous polymerization product is mixed in various proportions with a diluent material, such for example as trichlor benzene, trichlor ethylene, or with the liquid polymerization product above described, various mixtures having lower viscosities and low pour points can be obtained. For example, a mixture consisting of equal proportions of the resinous polymerization product and trichlor benzene has a pour point of minus 45° C. and a viscosity of approximately 44 to 48 seconds Saybolt. A mixture comprising 25% of the resinous polymerization product and 75% of trichlor benzene has a pour point of about minus 6° C. and a viscosity of approximately 35 to 40 seconds. Trichlor benzene itself has a pour point of about plus 10° C., a boiling point of 210 to 220° C., and a viscosity of about 30 seconds Saybolt at about 37.8° C.

In the drawing is shown a graph of pour points over a temperature range of mixtures containing various percentages of trichlor-benzene and a resinous polymerization product, the temperature being plotted as ordinates and the precentage of resin as abscissae. A eutectic mixture having a pour point of minus 45° C. is obtained when the composition is composed of about equal parts trichlorbenzene and trichlor ethylene resin. As is evident from the graph mixtures made up of about 25 to 75 per cent of trichlor benzene, and of about 75 to 25 percent of the above-described resin have pour points, (that is, remain liquid), well below 0° C.

Polymerized, unsaturated, halogenated, aliphatic hydrocarbons other than those prepared from trichlorethylene come within the scope of our invention. For example polymerized di- or tetra halogenated ethylene also the polymerized products of halogenated acetylene, propylene, butylene, and the like, may be prepared and employed for dielectric purposes. Mixtures of the polymerized products with other halogenated compounds such, for example, as chlorinated diphenyl, chlorinated diphenyl oxide, chlorinated diphenyl ketone and chlorinated diphenyl methane have been found to possess electrical and physical properties making them advantageous for use as dielectric material.

It will also be understood by those skilled in the art that other halogens such as fluorine, bromine and iodine may be substituted for the chlorine in the polymerized, unsaturated, chlorinated, aliphatic hydrocarbons herein described without departing from the spirit and scope of our invention.

What we claim as new and desire to secure by Letters Patent in the United States is:

1. A resinous product derived by the polymerization of trichlor ethylene, said product being of red coloration, being soluble in mineral oil and resisting temperatures as high as 300° C. without distillation.

2. A composition of matter comprising a mixture of trichlorbenzene and a solid resinous polymerization product of trichlor ethylene.

3. A composition of matter consisting of substantially 25 to 50 per cent of a solid resinous polymerized trichlor ethylene and 75 to 50 per cent of trichlor benzene, said composition having a pour point at least as low as minus 6° C. and a viscosity within the limits of about 35 to 45 seconds Saybolt.

4. A composition consisting essentially of 25 to 75 per cent of trichlor ethylene resin and 75 to 25 per cent of trichlor benzene, said composition solidifying at a temperature below 0° C.

5. A composition consisting of substantially equal parts of trichlor ethylene resin and trichlor benzene, said composition remaining liquid at temperatures as low as minus 45° C.

FRANK M. CLARK.
WALTER M. KUTZ.